Jan. 23, 1962 V. H. SUMMERS ET AL 3,018,116
STEERING MECHANISM FOR A CAMERA DOLLY
Filed June 25, 1956 5 Sheets-Sheet 1
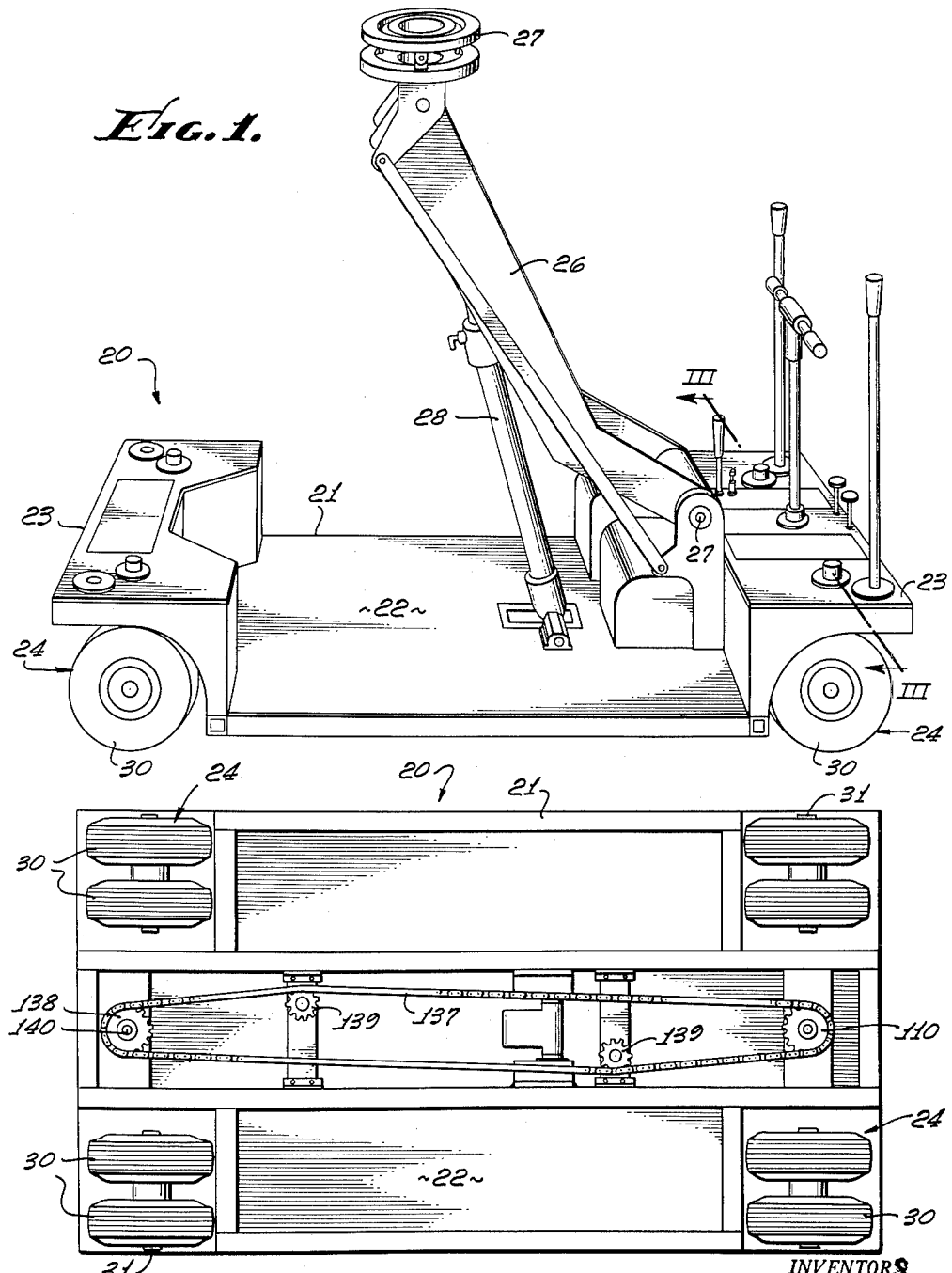
INVENTORS
VIRGIL H. SUMMERS
RALPH C. McCLURE
BY GEORGE H. KUNTZE
ATTORNEY.

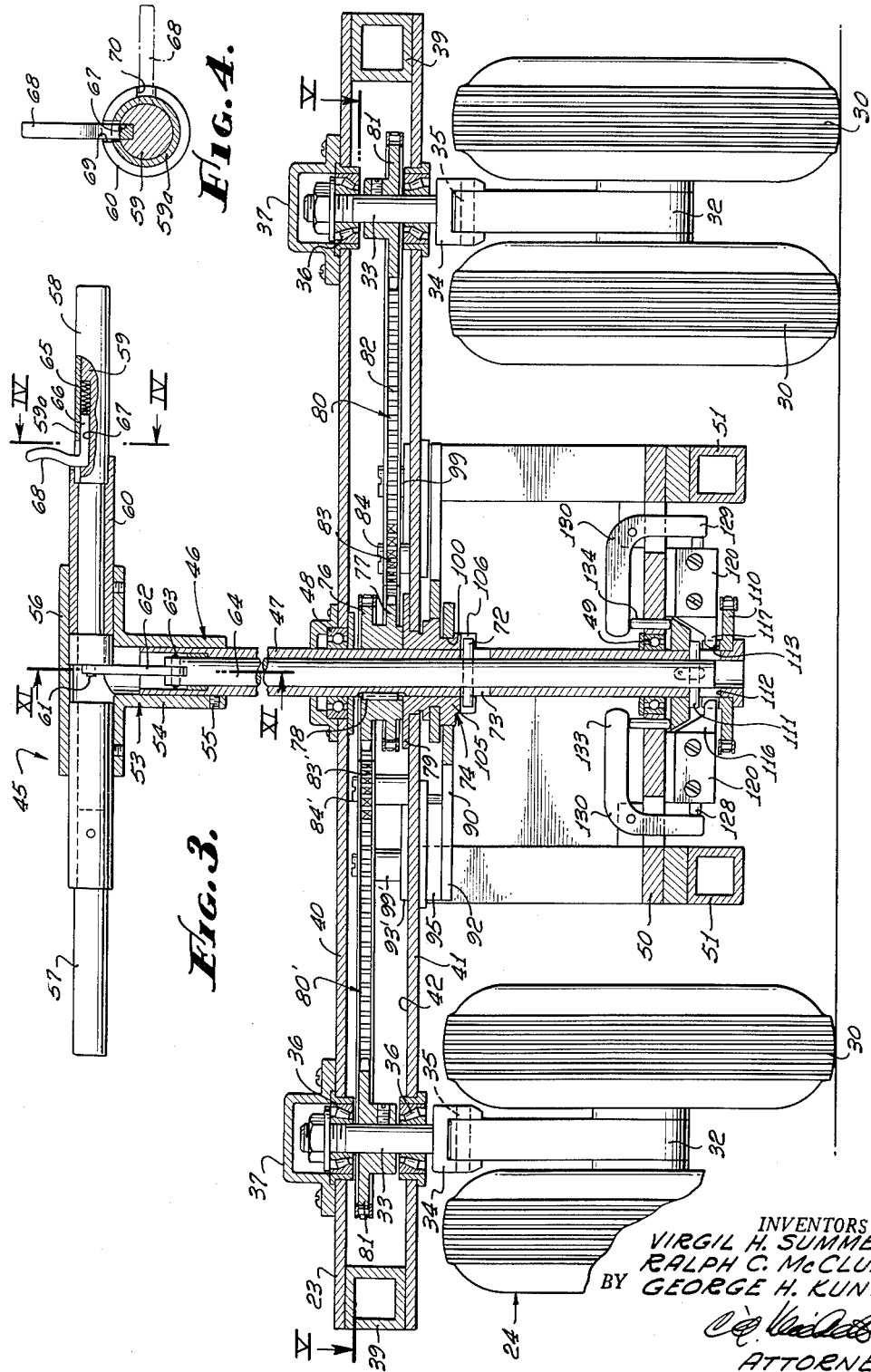

Jan. 23, 1962  V. H. SUMMERS ET AL  3,018,116
STEERING MECHANISM FOR A CAMERA DOLLY
Filed June 25, 1956  5 Sheets-Sheet 3
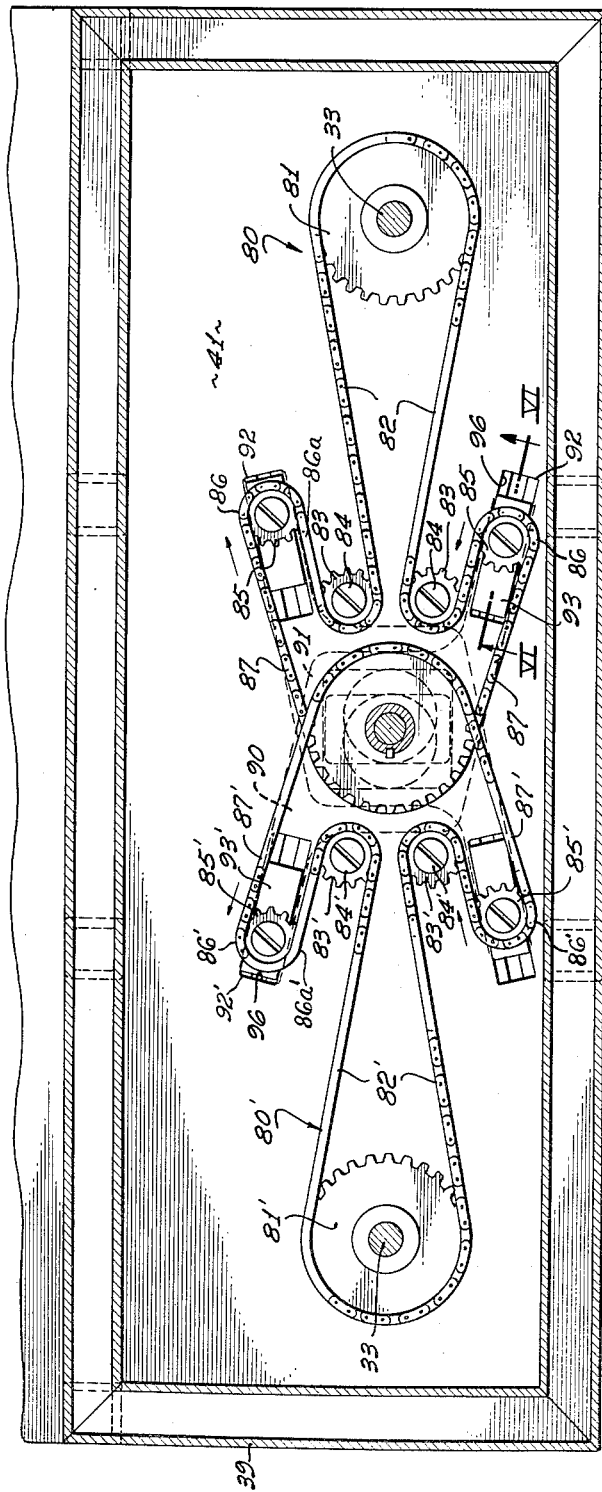
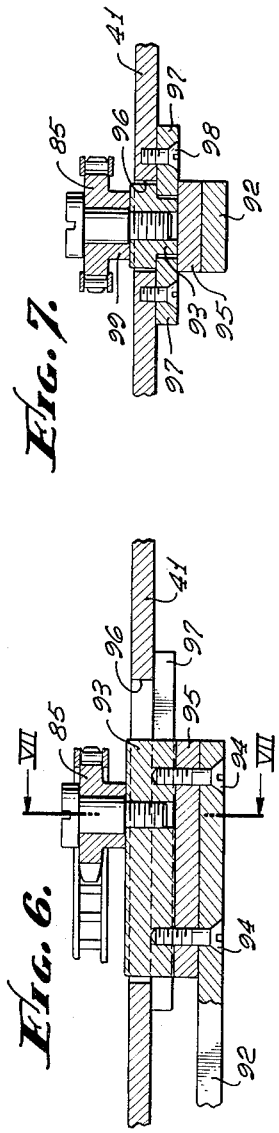
INVENTORS
VIRGIL H. SUMMERS
RALPH C. McCLURE
BY GEORGE H. KUNTZE
ATTORNEY.

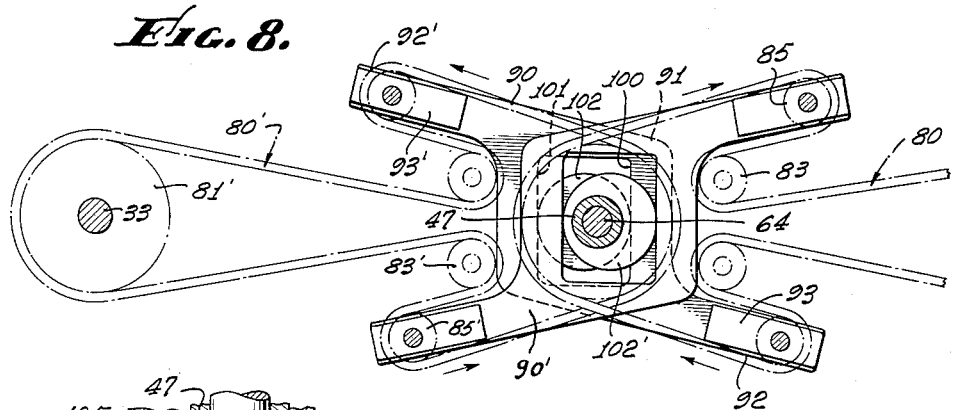
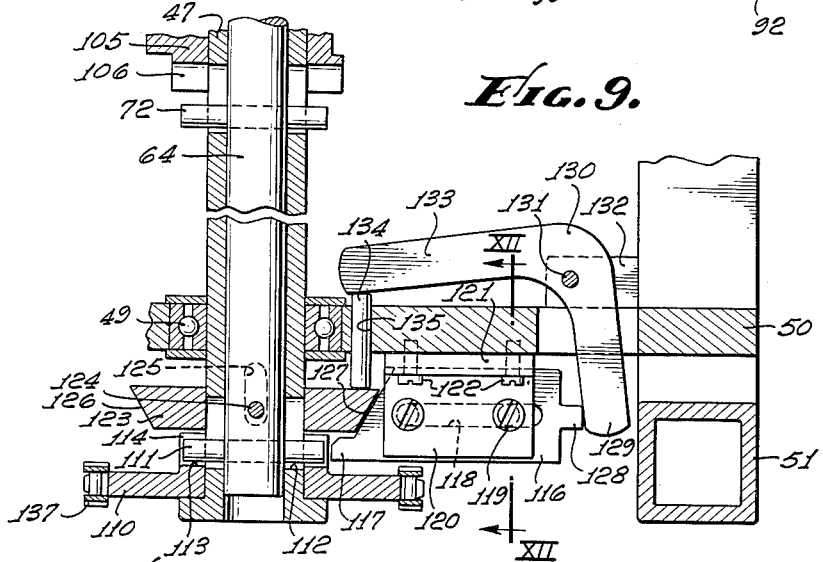
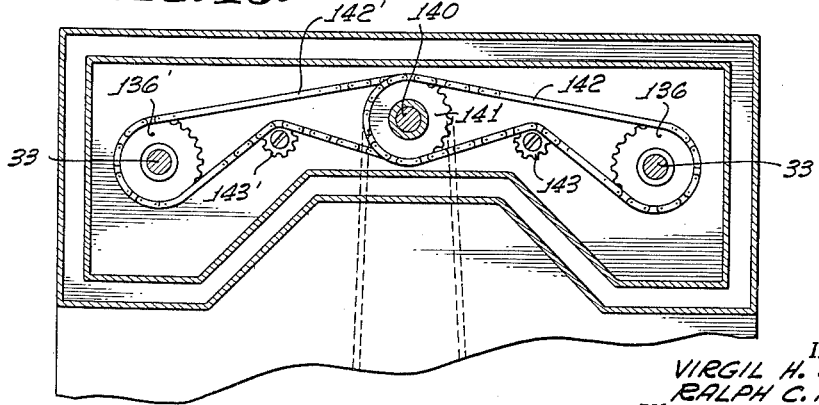
INVENTORS
VIRGIL H. SUMMERS
RALPH C. McCLURE
GEORGE H. KUNTZE
ATTORNEY.

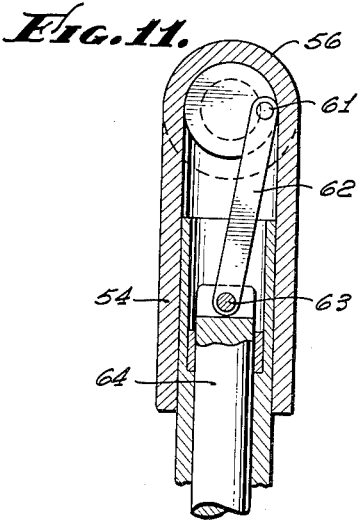
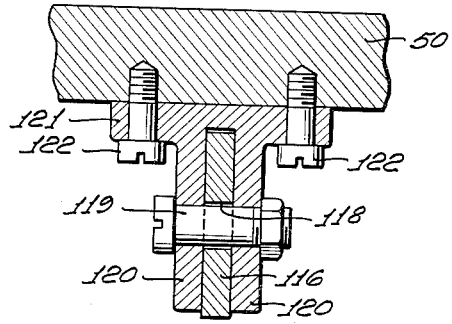
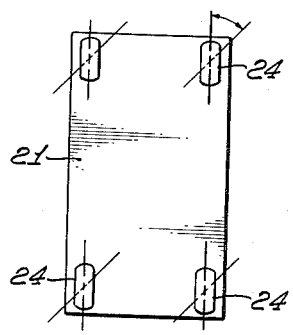
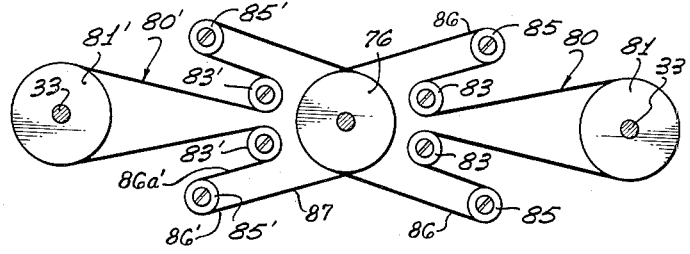
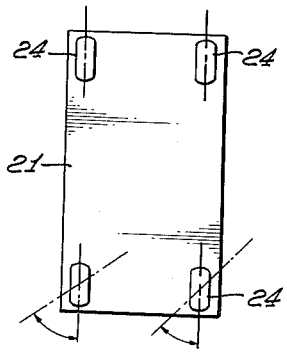
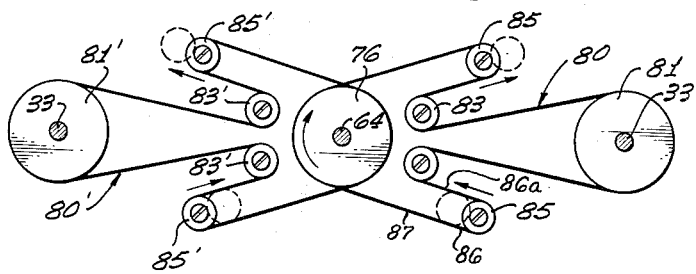
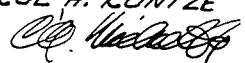

United States Patent Office 3,018,116
Patented Jan. 23, 1962

3,018,116
STEERING MECHANISM FOR A CAMERA DOLLY
Virgil H. Summers, Glendale, Ralph C. McClure, Northridge, and George H. Kuntze, Burbank, Calif., assignors to Universal Pictures Company, Inc., Universal City, Calif., a corporation of Delaware
Filed June 25, 1956, Ser. No. 593,435
13 Claims. (Cl. 280—91)

This invention relates to a steering mechanism and more particularly to a steering mechanism for a motion picture camera dolly for selectively imparting to the dolly a crabbing movement in which all wheels are simultaneously turned in the same direction through the same angle, and a turning movement in which only one pair of wheels is turned, each wheel of the one pair being turned through a different angle.

In motion picture photography, it is important that a motion picture camera be able to move relative to the subject being photographed so as to view the subject from different angles. Such relative movement of the motion picture camera with respect to the subject being photographed must be smoothly accomplished without jar and without abrupt changes in direction. In addition, the movement of a camera dolly must be as quiet as possible.

This invention contemplates a steering mechanism for a motion picture camera dolly or truck which will provide the dolly with virtually universal movement so that the dolly may be conveniently and readily maneuvered into any selected position relative to the subject being photographed. The invention contemplates a steering mechanism for the dolly which is readily selectively operable in order to conveniently steer the dolly along a selected path.

The primary object of this invention is therefore to disclose and provide a steering mechanism for a motion picture camera dolly or truck of novel construction and which will permit smooth changes in direction of the dolly to follow a selected path.

An object of this invention is to disclose and provide a steering mechanism for a motion picture camera dolly wherein crabbing movement may be imparted to the dolly in a convenient manner.

Another object of this invention is to disclose and provide a steering mechanism for a camera dolly wherein selectively actuatable means are provided for readily changing the movement of the dolly from a straight line forward, rearward, oblique and sideward movement (crabbing movement) to a turning movement about a selected point.

A general object of this invention is to disclose and provide a steering mechanism of novel construction to accomplish the purposes and objects above mentioned.

A more specific object of this invention is to disclose and provide a steering mechanism for a dolly wherein a pair of chain and sprocket means operably interconnect each wheel means of a pair of wheel means with a steering post, said chain and sprocket means including movable idle sprockets so mounted and actuated that each wheel means of said pair of wheel means is differentially turned through selected turning angles.

Still another object of this invention is to disclose and provide a steering mechanism for a motion picture camera dolly which is of simple effective construction, easy to manufacture and assemble, and conveniently selectively actuated so as to steer the dolly in a desired manner along a selected path.

A further object of this invention is to disclose and provide a steering mechanism for a dolly having two pair of wheels in which both pair of wheels may be simultaneously turned in the same direction through the same angle and in which lock means are provided for holding one pair of wheels in one position while the other pair of wheels may be differentially turned to steer the dolly about a selected point.

In the drawings:

FIG. 1 is a side perspective view of a camera dolly embodying this invention.

FIG. 2 is a bottom plan view of the dolly shown in FIG. 1.

FIG. 3 is a transverse sectional view taken through a vertical plane passing through the axes of a steering post and spindles of one pair of wheel means as indicated by line III—III of FIG. 1.

FIG. 4 is a sectional view taken in the plane indicated by line IV—IV of FIG. 3.

FIG. 5 is a transverse horizontal sectional view taken in the plane indicated by line V—V of FIG. 3.

FIG. 6 is a vertical sectional view taken in the plane indicated by line VI—VI of FIG. 5.

FIG. 7 is a sectional view taken in the plane indicated by line VII—VII of FIG. 6.

FIG. 8 is a fragmentary plan view showing cam plates and cam members of the steering mechanism, the chain and sprocket means associated therewith being diagrammatically indicated.

FIG. 9 is an enlarged fragmentary sectional view taken in the same plane as FIG. 3 and showing the lower portion of the steering post assembly when positioned to provide crabbing movement of the dolly.

FIG. 10 is a fragmentary plan view of chain transmission means at the end of the dolly opposite to the steering post.

FIG. 11 is a fragmentary sectional view taken in the plane indicated by line XI—XI of FIG. 3.

FIG. 12 is a fragmentary sectional view taken in the plane indicated by line XII—XII of FIG. 9.

FIG. 13 and FIG. 13a are diagrammatic views showing corresponding positions of the wheel means and the chain and sprocket means when both pair of wheel means are simultaneously turned.

FIG. 14 and FIG. 14a are diagrammatic views showing corresponding positions of the wheel means and the chain and sprocket means when only one pair of said wheel means is differentially turned.

FIG. 1 shows a camera dolly generally indicated at 20 embodying this invention. Dolly 20 may include a rectangular dolly frame means 21 having a low center of gravity provided by a dropped central portion 22. Opposite frame ends 23 of the dolly may provide space for end pairs of wheel means 24.

The central portion 22 of the dolly may provide space and mounting for a camera support arm 26 provided with a camera mount 27 at its top end. The camera support arm 26 may be pivotally mounted at 27 and may be moved about said pivotal mounting by a cylinder means 28. The details of construction of the camera support arm, it mounting, and cylinder means are not described because such does not form part of this invention.

The wheel means 24 at each end of the dolly are similarly constructed and only one will be described. Each wheel means 24 may include dual wheels 30 antifrictionally supported in spaced relation on a horizontal short axle 31, said axle being carried by a center support member 32, located between wheels 30. A vertical spindle 33 for each dual wheel assembly includes a depending yoke 34 pinned as at 35 to the top of support member 32. Each spindle 33 is positioned with its axis vertical in a pair of axially spaced bearing means 36 carried by dolly frame ends 23. The bearing means 36 may be of any well known manufacture. A top cover 37 may be provided for each spindle 33.

In this example, the dolly frame ends 23 may be formed of longitudinally extending side frame members 39 of box section, a top transverse plate 40, and a bottom transverse plate 41 providing a transversely extending hollow space 42. The top plate 40 at each end may be provided with suitable covered access openings therein as generally indicated in FIG. 1, such openings not being shown in detail for brevity and clarity.

The steering mechanism 45 of this invention is provided at one end of the dolly frame 21 and includes selective means to simultaneously pivot each wheel means 24 about its spindle 33 in the same direction through the same turning angle so as to provide crabbing movement of the dolly as diagrammatically indicated in FIG. 13. It also provides turning movement of the dolly by locking wheel means 24 at the non-steering end of the crab dolly against turning about spindle 33 and by then turning the wheel means 24 at the steering end of the dolly about different turning angles so as to permit the dolly to turn about a point exterior to the dolly in a smooth non-jarring manner.

The steering mechanism 45 includes a steering post assembly generally indicated at 46, said steering post assembly including a hollow tubular steering post 47 positioned between spindles 33 of the adjacent pair of wheel means 24. The axis of the steering post 47 may lie in the same vertical plane as the axes of the wheel spindles 33, said plane being sometimes referred to hereinafter as the plane of symmetry. The steering post 47 may be mounted for rotation in dolly frame end 23 by a top bearing means 48 carried by top plate 40 and by a bottom bearing means 49 carried by a transversely disposed horizontal plate 50 carried between wheel means 24 by a pair of depending end frame box section members 51. The bearing means 48 and 49 may be of any well known manufacture.

At its top, steering post 47 carries a fitting 53, the stem portion 54 receiving therein the top portion of the steering post and being non-rotatably secured thereto as by a set screw 55. A top cross portion 56 of fitting 53 may receive laterally extending handle means 57 and 58 for facilitating turning of the steering post 47 about its axis, handle means 58 being selectively positioned about its axis to selectively actuate the steering mechanism.

Handle means 58 includes a rotatable member 59 having its outer end received in a hand grip sleeve 59a. Member 59 extends through a mounting sleeve 60 secured within the cross portion 56 terminates above steering post 47. The inner end of rotatable member 59 is provided with an eccentric pin 61 which is pivotally connected to the top end of a depending link 62 pivotally connected at its bottom end 63 to the top end of an inner actuating rod 64 slidable within steering post 47. The eccentric mounting of pin 61 drives rod 64 into a top or bottom operative position along the axis of steering post 47 when handle means 58 is rotated.

Means for securing the handle means 58 in either of the two operative positions may include a compression spring 65 within the hand grip sleeve 59a of handle means 58, one end of said spring abutting a longitudinal slide 66 slidably movable and guidable in a groove 67 in member 59. The inner end of slide 66 may carry an upstanding thumb rest 68 biased by spring 65 into a notch 69 in sleeve 60 in one position. The thumb rest 68 may be readily retracted and rotated through 90° into a similar notch 70 in sleeve 60. Thus when handle means 58 is gripped, a thumb may conveniently engage thumb rest 68 and by retracting the thumb rest so as to release the same from notch 69, handle means 58 may be rotated through 90° to cause rod 64 to move axially into its bottom operative position.

Rod 64 carries between its ends a transverse pin 72 which is vertically slidable in a slot 73 provided in steering post 47 a selected distance below bottom plate 41. Pin 72 in FIG. 3 is illustrated in engagement with the bottom of a cam means generally indicated at 74 and is interlocked therewith when the rod 64 is in top operative position.

Intermediate ends of steering post 47 and within space 42 provided between top and bottom plates 40 and 41, the steering post 47 carries a pair of axially spaced steering post sprockets 76 and 77. Sprockets 76 and 77 are illustrated as being made in one piece and may be secured to the steering post 47 for rotation therewith by key means at 78. The diameters of sprocket means 76 and 77 are identical. The bottom sprocket 77 may rest upon a bearing surface provided on a steering post bushing 79 carried by bottom plate 41.

A pair of chain and sprocket means 80 and 80' interconnect respective steering post sprockets 77 and 76 to spindles 33 for transmission of differential rotation thereto. To facilitate description only one chain and sprocket means will be described in detail, the other being identical, and like parts being identified with reference numerals with a prime sign. Chain and sprocket means 80 includes a spindle sprocket 81 on wheel spindle 33 and an endless chain 82, said chain and sprocket means 80 and 80' lying in spaced parallel planes. Chain and sprocket means 80, 80' in neutral position (wheels parallel to longitudinal axes of the dolly) are identical in plan and symmetrically arranged with respect to a transverse plane of symmetry which passes through the axes of the spindles 33 and the steering post.

Chain and sprocket means 80 includes a pair of nonmovable rotatable idle sprockets 83 each pivoted on a pivot means 84 carried by the bottom plate 41. Idle sprockets 83 may be of substantially smaller diameter than sprockets 77 and 81 and the axes of the pair of idle sprockets 83 may be positioned in relatively close spaced relation to the plane of symmetry passing therebetween so as to cause bights 82 of chain 80 to converge in the direction of the steering post.

Chain and sprocket means 80 also includes a pair of idle, generally transversely movable sprockets 85, said sprockets being spaced from idle sprockets 83 in the direction of spindle 33 and away from the plane of symmetry so as to form sidewardly, diagonally extending return or back-folded loops 86 of chain 82 on opposite sides of the plane of symmetry and generally symmetrical thereto. Movable sprockets 85 define with sprocket 77, bights 87 of chain 82, said bights 87 being variable in length so as to differentially vary the lengths of loops 86 as later described. Each loop 86 may thus comprise a bight 87 and a bight 86a extending between movable sprocket 85 and stationary sprocket 83.

Each movable sprocket 85 and its generally diagonally opposite sprocket 85' form a set of movable companion sprockets 85, 85' adapted to be moved simultaneously in the same direction, this direction being opposite to the direction of movement of the other set of movable sprockets 85 and 85'. Each movable sprocket 85 and its companion sprocket 85' of a set may be associated with a cam means 74 including a cam plate 90 having a central portion 91 with oppositely directed parallel cam arms 92, 92' the longitudinal axes of said arms being spaced from the axis of the central portion 91 and inclined to said transverse plane of symmetry. The end of cam arm 92 carries an elongated rectangular T-section shoe 93 secured thereto as by spaced screw bolts 94 which extend through a spacer block 95 seated on the top of arm 92. The bottom plate 41 is provided with diagonally arranged elongated slots 96 each coaxial with the axis of the associated cam arm 92 for guiding shoe 93. A pair of guide plates 97, slidably receiving therebetween the stem of T-section shoe 93, may be secured as by screws 98 to bottom plate 41 along opposite edge margins of slot 96. Sprocket 85 is pivotally mounted on shoe 93 and has a relatively short sprocket hub 99. Sprocket 85' pivotally carried by shoe 93' has a long sprocket hub 99' in order to position sprockets 85, 85', in the respective planes of chain and sprocket means 80 and 80'.

The central portion 91 of each cam plate 90 may be provided with a rectangular shaped opening 100 which provides an internal cam edge 101 for engagement with an edge of associated crcular cam member 102 forming part of the cam means 74. The rectangular opening may have one axis thereof (its short axis as shown) parallel to the plane of symmetry. The circular cam member 102 is eccentrically mounted on steering post 47 and directly above cam member 102 is similarly provided a circular cam member 102′ eccentrically mounted on steering post 47 with its eccentricity being spaced 180° from cam 102. Cam members 102, 102′ lie in spaced planes of their respective associated chain and sprocket means 80, 80′. The cam members 102, 102′ may be formed in axial spaced relation on a cam body 105 which is rotatably mounted on steering post 47. The lower portion of cam body 105 may be provided with a transverse downwardly facing slot 106 adapted to interlock with pin 72 carried by rod 64 in top operative position for causing cam members 102, 102′ to rotate with steering post 47 whereby the dolly is turned by differential turning movement of one pair of wheel means through the chain and sprocket means about a point as later described.

Means to maneuver the dolly as by a crabbing movement, that is, each wheel means 24 is turned simultaneously through the same angle (see FIG. 13), may comprise a drive sprocket 110 mounted on the bottom of steering post 47 for rotation relative thereto when the differential turning movement of one pair of wheel means is desired and for rotation with said steering post when crabbing movement of the pairs of wheel means is desired. Such crabbing movement is accomplished by moving the actuating rod 64 to its lowermost operative position by handle means 58. The lower portion of actuating rod 64 may carry a transverse pin 111 slidable in a through slot 112 in the adjacent portion of the steering post 47 and engageable in interlocked relation with diametrically aligned slots 113 in an upstanding hub portion 114 of the drive sprocket 110. When transverse pin 111 is interlocked with slots 113, the upper transverse pin 72 is disengaged from slot 106 and cam means 74 is rendered inoperative. When cam means 74 is inoperative, sprockets 76, 77 are directly connected to spindle sprockets 81, 81′ for turning together through the same angle. The condition and relative positions of the movable and stationary sprockets 85, 85′ and 83, 83′, respectively, are illustrated in FIG. 13a.

Drive sprocket 110 is engaged with an endless chain 137 (FIG. 2) disposed centrally and longitudinally of the dolly, said chain 137 being engaged with a sprocket 138 at the non-steering end of the dolly. Suitable chain tightening, laterally adjustable idle sprockets 139 may be carried by the dolly frame for engagement with opposite lays of chain 137. Sprocket 138 is fixedly carried on the lower end of a vertical sprocket shaft 140 which may be journaled in suitable manner in the dolly frame end 23. Shaft 140 carries between top and bottom plates of the end frame 23 a dual sprocket 141 having meshed engagement with chains 142, 142′, each engaging a spindle sprocket 136, 136′ carried by spindles 33 of the front pair of wheel means 24. Each chain 142 may have meshed engagement with an idle sprocket 143, 143′ for maintaining desired tension in the chain.

Thus when drive sprocket 110 is interlocked for turning movement with steering post 47 by pin 111, any turning movement of the steering post will be transmitted in direct turning relation to chain 137 and to chains 142, 142′ whereby the spindles 33 of the pair of wheel means at the non-steering end will be simultaneously turned through the same angle as the spindles of wheel means 24 at the steering end of the dolly since the cam means 74 is disengaged from operative relation with the steering post and chains 82, 82′ are directly related to the steering post 47. Thus all four wheel means are turned simultaneously about the same angle.

Means to lock the drive sprocket 110 against rotation with steering post 47 when non-crabbing movement of the dolly is desired may comprise a pair of transversely diametrically arranged, vertically disposed lock plates 116 each having a radially inwardly extending locking lug 117 for interlocking engagement with a transverse slot 113 in the hub of the drive sprocket 110. Each lock plate 116 is mounted for horizontal sliding movement in its plane by means of a horizontal elongated slot 118 therein and a pair of spaced through bolts 119 carried by a pair of spaced depending flanges 120. Flanges 120 may be integral with a base 121 secured to plate 50 as by stud bolts 122.

Means to move the locking plates outwardly for disengagement thereof with drive sprocket 110 and to move said locking plates inwardly for engagement therewith may comprise an axial ported frusto-conical member 123 slidable on post 47 and fixed to actuating rod 64 by a pin 124, said pin being slidable in longitudinally extending slots 125 provided in post 47. The outer tapered face 126 of member 123 is slidably engageable with corresponding inclined faces 127 provided on inwardly facing edges of locking plates 116 above locking lugs 117. As the actuating rod is moved downwardly, tapered face 126 urges locking plates 116 radially outwardly to disengage locking lugs 117 from slots 113.

Each locking plate 116 carries an outer button 128 which abuts a depending arm 129 of a bell crank 130 pivotally mounted at 131 on a bracket 132. A radially inwardly extending bell crank arm 133 is seated at its end on a follower pin 134 longitudinally slidable in bore 135, said follower pin 134 resting at its lower end on top of member 123. Thus when actuating rod 64 is raised by manipulation of handle means 58, member 123 lifts follower pins 134 which causes rotation of bell cranks 130 to cause arms 129 to move radially inwardly and thus positively slidably move locking plates 116 inwardly to simultaneously interlock lugs 117 with slots 113 in drive sprocket 110 to hold drive sprocket 110 against rotation with steering post 47.

It will be noted that drive sprocket 110 is lockable against rotation with steering post 47 when the steering post is in neutral position, that is, when the handle means 57, 58 are transverse to the longitudinal axis of the dolly and the wheel means 24 lie parallel to the longitudinal axis of the dolly. In this position of wheel means 24, raising of actuating rod 64 will permit reception of top transverse pin 72 into the slot 106 of the cam means 74 whereby the dolly is selectively engaged for turning movement about a point. The wheel means 24 at the non-steering end are locked in normal position by the locking means above described.

When steering post 47 is now turned (see FIGS. 8, 14 and 14a), for example, in a clockwise direction, the steering post sprockets 76, 77 are simultaneously likewise turned in clockwise direction. The cam means 74 is also turned clockwise and in so turning, the cam members 102, 102′ cause the cam plates 90, 90′ to move in opposite directions. In FIG. 8, said cam plates are positioned at maximum turning of post 47 in a clockwise direction and the movable sprockets 85, 85′ at one side (upper part of FIG. 8) of said transverse plane of symmetry are moved apart a maximum distance while the movable sprockets 85, 85′ at the other side (lower portion of FIG. 8) of the plane of symmetry are moved to minimum spaced relation. As a result, in each chain and sprocket means 80, 80′, each loop 86 above the transverse symmetry plane is lengthened while the corresponding bight loop 86 below the symmetry plane is shortened. The dotted circles representing movable sprockets 85, 85′ in FIG. 14a illustrate the condition shown in FIG. 8. Thus, in the turning of the steering post from neutral position to maximum clockwise rotatable position, wheel means 24 is turned by sprocket means 80 through a selected turning angle while the wheel means 24 turned by sprocket means 80′ is turned through a different angle.

In other words, since each chain 82 is caused to move in the same direction about steering post 47 to cause movement in the same direction of spindle sprockets 81, 81', sprockets 81, 81' will be turned through different turning angles because of the cam means 74 which causes sets of companion sprockets 85, 85' to move in opposite directions to differentially vary the length of chain bights on opposite sides of the plane of symmetry.

As a more specific example of the differential turning of wheel means 24 produced by the cam means 74, let us suppose that steering post 47 is turned clockwise from neutral position through 10° (FIG. 5, FIG. 14a). Such movement will produce through cam members 102, 102', corresponding diagonally opposite movement of cam plates 90, 91'. As a result, loop 86 of chain 82 at the upper side of the transverse symmetry plane, as viewed in FIGS. 5 and 14a, will be lengthened, while the opposite, lower loop 86 will be shortened. Lengthening of upper loop 86 provides a greater amount of chain 82 between steering post sprocket 77 and spindle sprocket 81, the upper, movable sprocket 85 being moved in an outward direction. Sprocket 81 at the right of FIG. 5 will thus be turned through an angle somewhat less than 10° depending upon the eccentricity of circular cam members 102, 102' with respect to the axis of the steering post. On the left side of FIGS. 5 and 14a spindle sprocket 81' will be caused to turn through an angle greater than 10° because the upper loop 86' is lengthened by outward movement of the upper, movable sprocket 85', while the lower loop 86' is being shortened by inward movement of the lower movable sprocket 85'. At the same time the upper bight 87' of the chain 82' is being moved in a direction opposite to the direction of lengthening of loop 86'. Thus, upon clockwise turning of the steering post assembly, the cam plates 90, 90' are so moved in opposite directions as to cause the movable, upper idler sprockets 85, 85' to move away from each other and to lengthen upper loops 86, 86' which extend along the transverse symmetry plane, while at the same time the lower loops are shortened. When the steering post is turned in a counterclockwise direction, it will be understood that the lower loops 86 and 86' are lengthened while the upper loops 86, 86' are shortened in order to produce differential turning movement in the opposite direction. Thus differential turning of wheel means 24 at the steering end of the dolly is accomplished. It will be noted the amount of difference in the turning angles of the wheel means may be such as to cause each wheel means 24 to turn about a selected point which may include the axis of a spindle 33 at the non-steering end of the dolly so that there may be some pivotal movement of the dolly about one of said wheel means. If desired, the differential turning movement may be made about an external pivot point.

It will thus be readily apparent to those skilled in the art that a novel construction and arrangement of a steering mechanism for a camera dolly has been provided which is easily and readily maneuvered by a steering post such as post 47. Selective actuation of the steering mechanism readily produces a crabbing movement or a turning movement about a selected point. The steering mechanism provides a relatively simple, inexpensive construction which readily lends itself to the convenient steering of a camera dolly along linear and variable non-linear paths.

It is understood that various modifications and changes may be made in the steering mechanism which may come within the spirit of this invention, and all such changes and modifications coming within the scope of the appended claims are embraced thereby.

We claim:

1. A steering mechanism for a dolly, comprising: a steering post; a pair of wheel spindles on opposite sides of said steering post; a pair of chain and sprocket means lying in spaced planes and each interconnecting an associated spindle and the steering post; a pair of movable idle sprockets for each chain and sprocket means located between the steering post and the associated spindle; a pair of idler sprockets, each positioned between a movable sprocket and a spindle; a pair of cam plates, each cam plate interconnecting a movable sprocket of each pair with a diagonally opposite movable sprocket of the other pair; and cam means on the steering post operably connected to the pair of cam plates for simultaneously moving said interconnected sprockets.

2. A steering mechanism as stated in claim 1 wherein each cam plate is provided with a central portion provided with a cam edge, and oppositely extending arms on opposite sides of the central portion, each arm carrying one of said movable sprockets.

3. A steering mechanism as stated in claim 2 wherein said cam means on the steering post includes a circular cam member eccentric to the axis of the steering post and having engagement with the cam edge of an associated cam plate.

4. In a steering mechanism, the combination of: a pair of spaced wheel spindles and a steering post between said spindles, said post and spindles having axes lying in the same transverse plane; a chain and sprocket means associated with each spindle and the steering post and lying in spaced planes perpendicular to the plane of said axes; each chain and sprocket means including a loop extending along said transverse plane and a movable idle sprocket lying within the loop on each side of the plane of the axes between the steering post and the associated spindle; and means including a pair of cam plates, each carrying one of said movable idler sprockets associated with each chain and sprocket means and operative to differentially move said movable sprockets associated with each chain and sprocket means to vary the length of said bights.

5. In a steering mechanism, the combination of: a pair of spaced wheel spindles and a steering post between said spindles, said post and spindles having axes lying in the same transverse plane; a chain and sprocket means associated with each spindle and the steering post and lying in spaced planes perpendicular to the plane of said axes; each chain and sprocket means including a loop and a movable idle sprocket therewithin lying on each side of the transverse plane of the axes between the steering post and the associated spindle, said loop extending along said plane and inclined thereto; and means operatively connected to the steering post and operative to move said movable sprockets to increase the length of the loop on one side of the plane of the axes while decreasing the length of the loop on the other side of the plane of the axes.

6. In a steering mechanism, the combination of: a pair of spaced wheel spindles and a steering post therebetween; a pair of chain and sprocket means each associated with and interconnecting one of the spindles and the steering post; each chain and sprocket means including a pair of movable idle sprockets and a pair of stationary idler sprockets between the steering post and the associated spindle and a loop extending between said steering post and each of said stationary idle sprockets and extending over one of said movable idler sprockets; and cam means operably associated with said steering post and with said pair of movable sprockets to differentially move said movable sprockets of each pair to vary the lengths of said loops.

7. A steering mechanism as stated in claim 6 wherein said cam means includes a cam plate interconnecting one of said pair of movable sprockets associated with one chain and sprocket means with one of said other pair of movable sprockets associated with the other chain and sprocket means.

8. A steering mechanism as stated in claim 6 wherein the operative means includes a transversely movable cam plate carrying a movable sprocket of each pair of sprockets on opposite sides of the steering post and having a cam edge adjacent the steering post, and a cam member actuable by the steering post and engageable with the cam edge for moving said cam plate and said movable sprockets relative to the steering post.

9. A steering mechanism as stated in claim 8 wherein said cam member is circular and is eccentric to the axis of the steering post.

10. A steering mechanism as stated in claim 6 including means to actuate said chain and sprocket means without movement of the movable sprockets.

11. In a steering mechanism for a dolly, including at each end a pair of wheel means having vertically disposed spindles, the combination of: a steering post assembly between the wheel spindles of one pair of wheel means; a pair of chain and sprocket means lying in spaced, parallel planes, each of said means including a pair of stationary idler sprockets and a pair of movable idler sprockets, one of said stationary sprockets and one of said movable sprockets of each pair lying on one side of a plane extending between said steering post assembly and one of said spindles and forming a chain loop extending along the plane and inclined thereto; cam means including a pair of cam plates, each diagonally interconnecting and carrying one of said movable sprockets of each pair and a cam member on said stationary post assembly cooperably engageable with each of said cam plates, whereby said cam plates may be moved in opposite directions to differentially vary the length of said chain loops; a drive sprocket carried by the steering post assembly; a drive chain means connecting the drive chain sprocket and the spindles of the other pair of wheel means; and means on the steering post assembly to selectively actuate said drive sprocket or said cam means.

12. A steering mechanism as stated in claim 11 wherein actuating means includes an actuating rod carried by the steering post assembly and means on said rod selectively connectable with said cam means and with said drive sprocket.

13. A steering mechanism as stated in claim 12, including lock means for said connectable means, said lock means including a slidable lock plate and means on said drive sprocket engageable therewith.

References Cited in the file of this patent

UNITED STATES PATENTS

| | | |
|---|---|---|
| 1,255,775 | Mueller | Feb. 5, 1918 |
| 1,801,043 | Harber et al. | Apr. 14, 1931 |
| 2,228,247 | Cunningham | Jan. 14, 1941 |
| 2,470,496 | Krilanovich | May 17, 1949 |
| 2,715,534 | Hoge et al. | Aug. 16, 1955 |
| 2,756,066 | Ludowici | July 24, 1956 |
| 2,834,605 | McCollough | May 13, 1958 |
| 2,842,376 | Krilanovich | July 8, 1958 |

FOREIGN PATENTS

| | | |
|---|---|---|
| 451,813 | Great Britain | Aug. 12, 1936 |